(12) United States Patent
Sampath et al.

(10) Patent No.: US 9,146,296 B2
(45) Date of Patent: Sep. 29, 2015

(54) METHODS AND APPARATUSES FOR USE IN PROVIDING POSITIONING ASSISTANCE DATA TO MOBILE STATIONS VIA A SELF-ORGANIZING NETWORK

(75) Inventors: Ashwin Sampath, Skillman, NJ (US); Raja Sekhar Bachu, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 13/007,379

(22) Filed: Jan. 14, 2011

(65) Prior Publication Data

US 2012/0184285 A1 Jul. 19, 2012

(51) Int. Cl.
| | | |
|---|---|---|
| *G01S 5/02* | (2010.01) | |
| *H04W 48/08* | (2009.01) | |
| *H04W 64/00* | (2009.01) | |
| *H04W 84/18* | (2009.01) | |

(52) U.S. Cl.
CPC .............. *G01S 5/0236* (2013.01); *H04W 48/08* (2013.01); *H04W 64/00* (2013.01); *H04W 84/18* (2013.01)

(58) Field of Classification Search
CPC ..... H04W 64/00; H04W 48/08; H04W 84/18; G01S 5/0236
USPC ............ 455/456.1–457, 404.2; 370/328, 338; 342/450, 463–465, 352–358
See application file for complete search history.

(56) References Cited

U.S. PATENT DOCUMENTS

| | | | |
|---|---|---|---|
| 8,249,619 B2 * | 8/2012 | Kong | 455/456.1 |
| 2008/0188243 A1 | 8/2008 | Giustina et al. | |
| 2009/0312022 A1 | 12/2009 | Viorel et al. | |
| 2009/0312024 A1 | 12/2009 | Chen et al. | |
| 2010/0016022 A1 | 1/2010 | Liu et al. | |
| 2010/0073229 A1 | 3/2010 | Pattabiraman et al. | |
| 2010/0093307 A1 | 4/2010 | Hui et al. | |
| 2012/0083288 A1 * | 4/2012 | Siomina | 455/456.1 |

FOREIGN PATENT DOCUMENTS

| | | |
|---|---|---|
| EP | 2252114 A1 | 11/2010 |
| JP | 2002544734 A | 12/2002 |
| TW | 201024786 A | 7/2010 |
| WO | 0069205 A1 | 11/2000 |
| WO | WO-2006006463 A1 | 1/2006 |
| WO | WO-2010042618 | 4/2010 |
| WO | WO-2010144607 A1 | 12/2010 |

OTHER PUBLICATIONS

International Search Report and Written Opinion—PCT/US2012/020996—ISAEPO—Mar. 19, 2012.

(Continued)

*Primary Examiner* — Marcos Torres
(74) *Attorney, Agent, or Firm* — Jimmy Cheng

(57) ABSTRACT

Techniques are provided which may be implemented using various methods and/or apparatuses to allow a mobile station to receive positioning assistance data that may be used in a signal-based position estimation process. For example, a device at a node of a self organizing network (SON) portion of a communication network may be self-provisioned by establishing and providing selected positioning assistance data to a mobile station.

29 Claims, 6 Drawing Sheets

(56) References Cited

OTHER PUBLICATIONS

Qualcomm Incorporated: "Positioning support with HeNBs", 3GPP Draft; R3-100342, 3rd Generation Partnership Project (3GPP), Mobile Competence Centre ; 650, Route Des Lucioles ; F-06921 Sophia-Antipolis Cedex ; France, vol. RAN WG3, no. Valencia, Spain; Jan. 18, 2010, Jan. 15, 2010, XP050424185, [retrieved on Jan. 15, 2010].

Qualcomm Incorporated: "Proposed work item on positioning enhancements", 3GPP Draft; R2-101582, 3rd Generation Partnership Project (3GPP), Mobile Competence Centre ; 650, Route Des Lucioles ; F-06921 S0phia-Antip0lis Cedex;France, vol. RAN WG2, no. San Francisco, USA;Feb. 22, 2010, Feb. 24, 2010,XP050421946,[retrieved on Feb. 24, 2010],p. 4-p. 5.

Taiwan Search Report—TW101101382—TIPO—Mar. 20, 2014.

\* cited by examiner

METHODS AND APPARATUSES FOR USE IN PROVIDING POSITIONING ASSISTANCE DATA TO MOBILE STATIONS VIA A SELF-ORGANIZING NETWORK

BACKGROUND

1. Field

The subject matter disclosed herein relates to electronic devices, and more particularly to methods and apparatuses for use in providing selected positioning assistance data to mobile stations via at least one device associated with at least one node of a self-organizing network.

2. Information

Among other things, existing wireless communication networks and carrier infrastructures may enable observed time difference of arrival (OTDOA) and/or advanced forward link trilateration (AFLT) techniques for estimating a position and/or location of a mobile station. Here, with knowledge of the locations of neighboring base station transmitters and time-reference data, a mobile station may determine a range to such base station transmitters based upon measured signal propagation delays. Mobile stations typically receive information about such base stations, such as, locations of neighboring base stations and time-reference data as "assistance data" that is provided to the mobile stations from the base station nodes themselves. Such assistance data may include, for example, relative transmit time between base stations, the location of nearest base stations, the location of a serving base station, etc., which may be used to enable a position fix. Such assistance data is typically received from a serving base station.

To expand coverage, wireless communication networks and carrier infrastructures have been incorporating nodes as part of a self organizing network (SON). Such nodes may comprise femtocells which may be installed by homeowners and small business owners to expand and/or augment coverage where not adequately provided by existing base stations in the communication network. However, a femtocell is typically not provisioned to participate in the process of providing OTDOA or AFLT positioning services. For example, a SON node is typically not provisioned with assistance data and, therefore, is not capable of providing desired assistance data to mobile handsets for performing OTDOA or AFLT.

SUMMARY

In accordance with certain aspects, techniques are provided which may be implemented using various methods and/or apparatuses to allow a mobile station to receive positioning assistance data that may be used in a signal-based position estimation process. For example, a device at a node of a self organizing network (SON) portion of a communication network may be self-provisioned by establishing and providing selected positioning assistance data to a mobile station.

By way of example, a method may be implemented in a device operating at a first node of a self organizing network portion of a communication network to provide a wireless communication access service. The method may enable the device to establish selected positioning assistance data based, at least in part, on received positioning information associated with one or more base stations of a communication network that may be available to at least transmit one or more positioning signals to a mobile station for use in signal-based position estimation. The method may enable the device to establish selected positioning assistance data based, at least in part, on a determination as to whether the first node and/or at least one other node of the self organizing network portion may be available to transmit at least one of positioning signals to the mobile station. The method may further enable the device to transmit at least a portion of the selected positioning assistance data over a communication link to the mobile station.

In certain further example implementations, a determination that the first node is available to transmit at least one of the positioning signals may be based, at least in part, on an estimated synchronization error between the first node and at least one of the base stations, an estimated position error associated with an estimated position of the first node, and/or a power class associated with the first node.

In certain further example implementations, a determination that the at least one other node of the self organizing network portion is available to transmit at least one of the positioning signals may be based, at least in part, on an estimated synchronization error between the other node and at least one of the base stations, an estimated position error associated with an estimated position of the other node, and/or a power class associated with the other node.

In certain further example implementations, the device may respond to a request for positioning assistance data received from the mobile station while the first node is acting as a serving communication node to the mobile station.

In certain further example implementations, the transmitted selected positioning assistance data comprises information identifying a plurality of the one or more base stations. In other implementations, the transmitted selected positioning assistance data may, for example, comprise information identifying a particular base station from which additional positioning assistance data is available to the mobile station. In certain example implementations, the received positioning information may comprise information associated with at least one of the base stations comprising a node of a self organizing network portion and may also identify at least one of an estimated position, an estimated position error, and/or a power class.

BRIEF DESCRIPTION OF DRAWINGS

Non-limiting and non-exhaustive aspects are described with reference to the following figures, wherein like reference numerals refer to like parts throughout the various figures unless otherwise specified.

1, capable of providing selected positioning assistance data to a mobile station, in accordance with an implementation.

Figure 1:
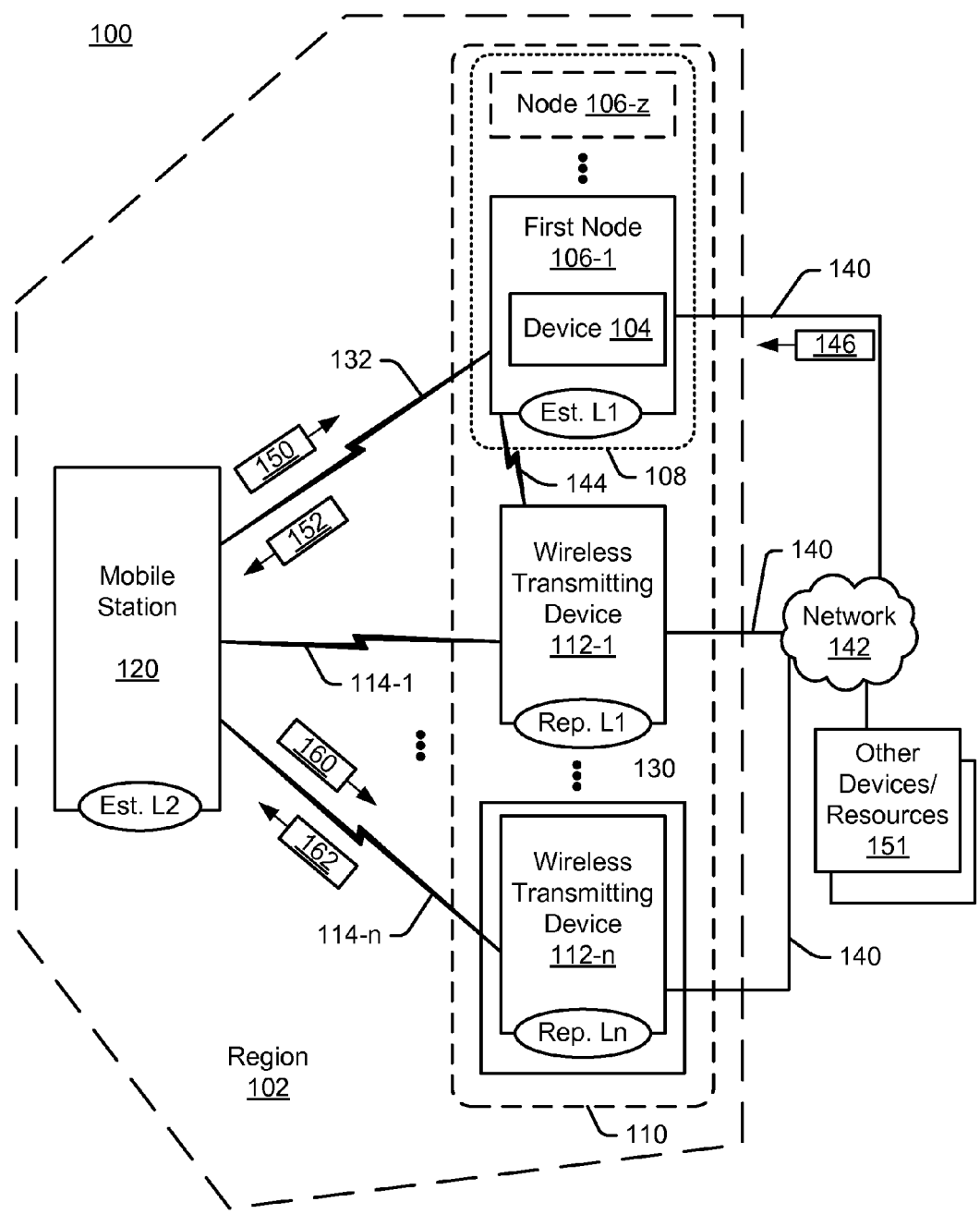
FIG. 1 is a schematic block diagram illustrating an exemplary environment that includes a device at a node of a self-organizing network, the device being capable of providing selected positioning assistance data to a mobile station, in accordance with an implementation.
Figure 6:
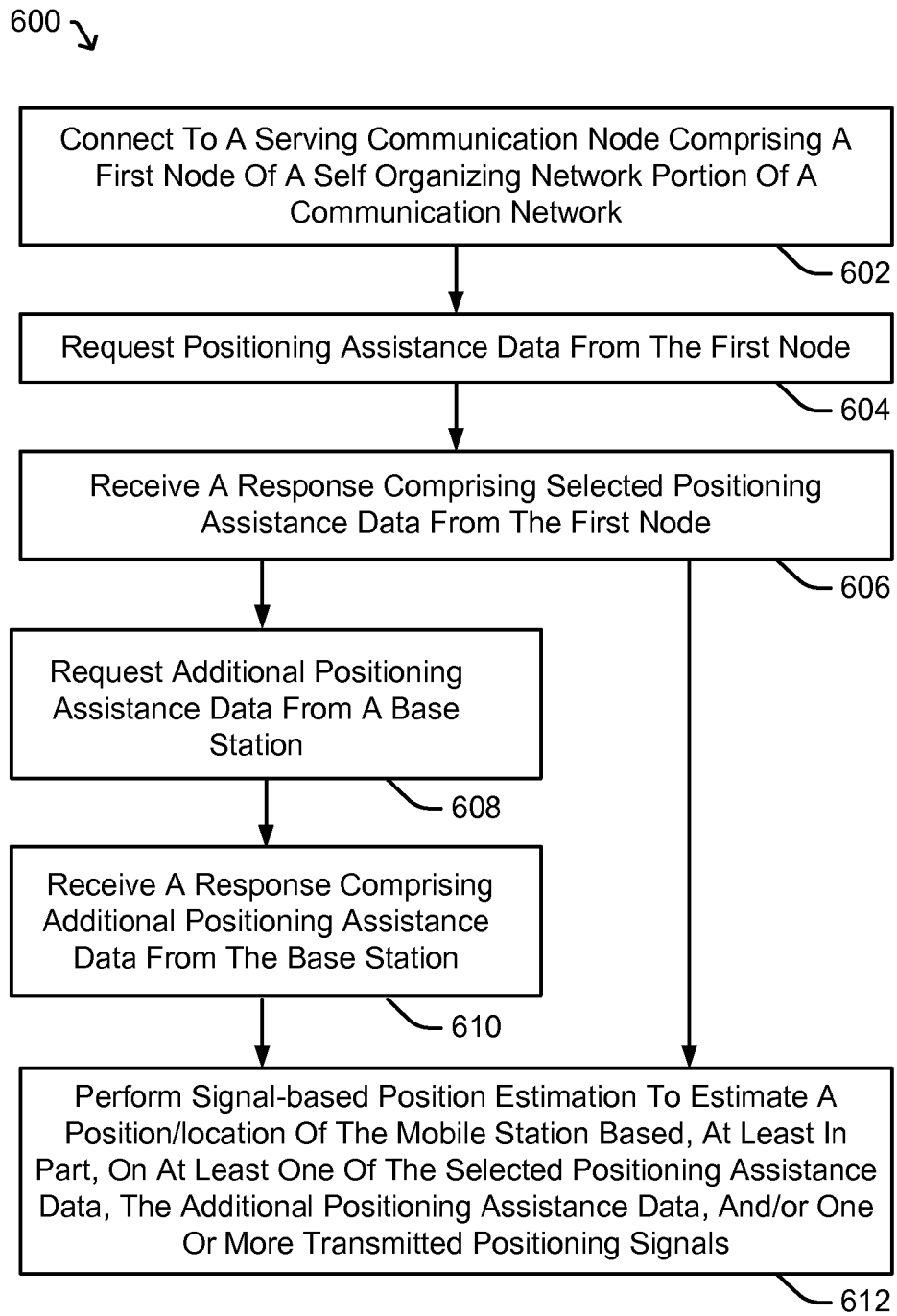

FIG. 6 is a flow diagram illustrating certain features of an exemplary process for use in a mobile station, for example as in FIG. 1, capable of receiving selected positioning assistance data, in accordance with an implementation.

DETAILED DESCRIPTION

In accordance with certain aspects, techniques are provided which may be implemented using various methods and/or apparatuses to establish and provide certain positioning assistance data to a mobile station for use in signal-based position estimation.

In certain example implementations a communication network may be arranged to provide one or more wireless communication access services to one or more mobile stations. For example, a communication network may provide voice and/or data communication services to a mobile station via one or more base stations (e.g., cellular base stations, wireless access points, etc.). In certain instances, a communication network may comprise and/or otherwise operatively utilize one or more other devices that may augment and/or otherwise support the base stations. For example, one or more other devices may be operatively provided in a self organizing network (SON) portion of a communication network. Here, for example, a device, such as, a specific computing device, access point, base station, and/or the like, may operate as part of a first node of a SON portion of a communication network by communicating with a mobile station via a wireless communication link.

By way of non-limiting example, such a device may comprise a "femtocell", "picocell", and/or other like appliance that may act as a serving communication node for a mobile station to provide connectivity between the mobile station and a cellular and/or other like communication network. In other example implementations, such a device may comprise an access point, location beacon, and/or other like appliance that may provide connectivity between the mobile station and one or more wireless and/or non-wireless communication networks.

In a particular example and as described in greater detail herein, a device associated with a node of a SON portion of a communication network may be capable of supporting signal-based position estimation by a mobile station by establishing and providing certain positioning assistance data to the mobile station.

By way of example, a mobile station may perform signal-based position estimation based, at least in part, on the use of observed time difference of arrival (OTDOA), advanced forward link trilateration (AFLT), and/or other like techniques for estimating a position relative to one or more transmitting devices, and possibly a location relative to a reference map and/or coordinate system. For example, with knowledge of reported locations of neighboring base station transmitters and time-reference data, a mobile station may measure a range to such base station transmitters based upon an observed signal propagation delay. Mobile stations may, for example, receive such reported locations of the neighboring base stations and time-reference data as "assistance data" from the base station nodes themselves. Such assistance data may include, for example, relative transmit time between base stations, the location of nearest base stations, the location of a serving base station, etc., to enable a position fix. Such assistance data is typically received from a serving base station.

In certain situations a node may be added to a SON portion without being provisioned to immediately support signal-based position estimation by a mobile station. For example, a SON node is typically not provisioned in advance with applicable assistance data that may be of use to a mobile station.

In accordance with an aspect of the present description, a node (e.g., "a first node") of a SON portion of a communication network may provision itself to be capable of supporting signal-based position estimation by a mobile station, at least in part, by establishing and providing certain positioning assistance data to the mobile station. For example, a device of a first node may establish and provide "selected positioning assistance data" to a mobile station. The selected positioning assistance data may be based, at least in part, on positioning information received by the first node. Here, the selected positioning assistance data may be associated with one or more base stations of the communication network that may be available to transmit one or more positioning signals to a mobile station for use in signal-based position estimation (e.g., using trilateration, and/or other like known techniques). For example, received positioning assistance data may be associated with neighboring and/or other like base stations within a region with the first node. As such, a device at the first node may obtain positioning information from a plurality of base stations and use all or portions thereof to establish selected positioning assistance data which may be provided to a mobile station. In certain example instances, selected positioning assistance data may comprise all or part of the positioning data that may be provided by a base station to the mobile station. In certain example instances selected positioning assistance data may be based, at least in part, on all or part of the positioning data that may be provided by a base station to the mobile station. For example, selected positioning assistance data may comprise filtered, adapted, or otherwise tailored information based on least some of the positioning data that may be provided by a base station to the mobile station.

Additionally, the selected positioning assistance data may be based, at least in part, on a determination as to whether the first node and/or at least one other SON node may be available to transmit one more positioning signals to the mobile station.

Here, for example, a device of the first node may determine whether the first node (and/or other SON node) is operatively available to transmit a positioning signal to a mobile station based, at least in part, on an estimated synchronization error between the first node (and/or other SON node) and at least one of the base stations. Here, for example an estimated synchronization error may be based, at least in part, on the timing and/or clocks of the respective node(s) and base station(s) and/or communication network, etc. As such, an estimated synchronization error may be compared to a time threshold value or the like, e.g., to determine whether a timing of a SON node is sufficiently synchronized with a timing of a base station to allow a mobile station to perform a desired signal-based position estimation based, at least in part, on positioning signals received from the first node. Hence, there may be situations wherein an estimated synchronization error is significant enough to warrant against using or including the first node (and/or other SON nodes) in selected positioning assistance data as transmitted to a mobile station.

In another example, a device of the first node may determine whether the first node (and/or other SON node) is operatively available to transmit a positioning signal to a mobile station based, at least in part, on an estimated position error associated with an estimated position of the first node (and/or other SON node). For example, such estimated position error may be compared to a distance threshold value to determine whether the estimated position of the first node is sufficiently accurate enough to allow a mobile station to perform desired signal-based position estimation processes based, at least in part, on positioning signals received from the first node. Hence, there may be situations wherein an estimated position error is significant enough to warrant against using or including the first node (and/or other SON nodes) in selected positioning assistance data as transmitted to a mobile station.

In yet another example, a device of the first node may determine whether the first node (and/or other SON node) is operatively available to transmit a positioning signal to a mobile station based, at least in part, on a power class associated with the first node (and/or other SON node). For example, such power class may be compared to a transmit power threshold value to determine whether the power class of the first node is sufficiently powered (e.g., not too weak or too strong) to allow a mobile station to perform a desired signal-based position estimation based, at least in part, on positioning signals received from the first node. Hence, there may be situations wherein a power class is different enough to warrant against using or including the first node (and/or other SON node) in selected positioning assistance data as transmitted to a mobile station.

Attention is drawn now to FIG. 1 which is a schematic block diagram illustrating an example environment 100, comprising a region 102 within which a device 104 is provided at an estimated location (L1) as part of a first node 106-1 of a SON portion 108 of a communication network 110. A mobile station 120 is provided at estimated location L2. In certain example implementations, SON portion 108 may comprise a plurality of SON nodes, represented by node 106-z. The SON nodes of SON portion 108 may, for example, comprise the same devices and/or technology, or may be different from one another. Device 104 may, for example, represent a specific purpose computing device. In certain example implementations, region 102 may comprise all or part of a cell within a cellular network. In certain other example implementations, region 102 may comprise more than one cell within one or more cellular networks. Region 102 may, for example, be associated with a specific SON node, and/or a plurality of SON nodes. Selected positioning assistance data transmitted by first node 106-1 to mobile station 120 may, for example, be specifically associated with devices capable of operatively transmitting positioning signals that may be of use by mobile station 120.

Communication network 110 may, for example, comprise one or more base stations 130, illustrated by wireless transmitting devices 112-1 through 112-n, with reported locations (e.g., estimated, or otherwise) of Rep. L1 through Rep. Ln, respectively. Wireless transmitting devices 112-1 through 112-n may communicate with mobile station 120 over wireless communication links 114-1 through 114-n. In certain example implementations, one or more wireless transmitting devices 112 may take the form of a cellular and/or other like arranged telecommunication base station, wireless network access point, and/or the like which provides connectivity to other devices/resources 151, for example, via one or more networks 142. In certain example implementations, one or more wireless transmitting devices 112 may take the form of a location beacon transmitting device, which may support desired signal-based position estimation performed by a mobile station. Hence, as used herein the basic term "base station" is meant to broadly comprise various devices that at least support certain desired signal-based position estimation as may be performed by a mobile station.

Mobile station 120 is representative of any electronic device that may be reasonably moved about by a user. A mobile station may sometimes be referred to as, e.g., a user equipment or a mobile device. By way of example but not limitation, a mobile station may comprise a computing and/or communication device such as a mobile telephone, a smartphone, a laptop computer, a tablet computer, a netbook, a smartbook, a wearable computer, a personal digital assistant, a navigation device, etc.

Mobile station 120 may, for example, be enabled (e.g., via one or more network interfaces) for use with various wireless communication networks such as a wireless wide area network (WWAN), a wireless local area network (WLAN), a wireless personal area network (WPAN), and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), LTE Advanced, WiMAX, Ultra Mobile Broadband (UMB), and/or the like.

As illustrated, one or more of SON nodes 106 and/or wireless transmitting devices 112 may be operatively connected to network 142, which may be representative of one or more wired and/or wireless communication networks and/or the like which enables communication to other devices/resources 151 (e.g., servers, computing devices, mobile stations, telephones, networks, telephony, services, etc.). By way of example, network 142 may include a telecommunications and/or data network, an intranet, the Internet, etc.

In certain example implementations, during installation and/or at one or more other times (e.g., during an update, based on a timer, etc.), first node 106-1 may actively and/or passively obtain positioning information associated with one or more base stations and/or other SON nodes 106. For example, first node 106-1 may actively obtain positioning information associated with one or more base stations and/or other SON nodes 106 by specifically requesting such information from one or more wireless transmitting devices 112, other communication network devices/resources, and/or accessing other devices/resources 151 to obtain such information.

Thus, for example, first node 106-1 may receive one or more signals representing positioning information associated with a base station over a non-wireless communication link 140 and/or a wireless communication link 144. Here, for example, a message 146 may be sent by wireless transmitting device 112-1 to first node 106-1 over a non-wireless communication link 140 (e.g., via network 142). Alternatively, message 146 may be sent by wireless transmitting device 112-1 to first node 106-1 over wireless communication link 144.

First node 106-1 may, for example, passively obtain positioning information associated with one or more base stations and/or other SON nodes 106 by receiving such information without specifically requesting such. For example, first node 106-1 may obtain positioning information associated with one or more base stations and/or other SON nodes 106 by listening for and receiving broadcasted positioning information from one or more wireless transmitting devices 112.

As further illustrated in FIG. 1, mobile station 120 may transmit, over wireless communication link 132, a request 150 (e.g., one or more messages) for positioning assistance data to first node 106-1, e.g., while first node 106-1 is acting as a serving node for mobile station 120. First node 106-1 may transmit, over wireless communication link 132, a response 152 (e.g., one or more messages) comprising selected positioning assistance data.

In certain other example implementations, rather than respond to a request 150, first node 106-1 may independently decide to transmit or otherwise broadcast selected positioning assistance data.

In certain example implementations, transmitted selected positioning assistance data may comprise information identifying a plurality of base stations and/or SON nodes that may be available to support signal-based position estimation.

In certain example implementations, transmitted selected positioning assistance data may comprise information identifying a particular base station from which additional positioning assistance data may be available to mobile station 120. Thus, as further illustrated in FIG. 1, based on response 152, mobile station 120 may subsequently transmit, over wireless communication link 114-n, a request 160 (e.g., one or more messages) for such additional positioning assistance data to base station 130. Base station 130 may, for example, transmit, over wireless communication link 114-n, a response 162 (e.g., one or more messages) comprising additional positioning assistance data. In certain example implementations, transmitted additional positioning assistance data may comprise information identifying a plurality of base stations and/or SON nodes that may be available to support signal-based position estimation.

Thus, as illustrated in FIG. 1, mobile station 120 may receive selected positioning assistance data from a serving node (e.g., first node 106-1) and possibly additional positioning assistance data from one or more non-serving nodes (e.g., base station 130). Moreover, the selected positioning assistance data as transmitted to mobile station 120 may selectively identify that positioning signals transmitted by first node 106-1 and/or other SON nodes are available for use by mobile station 120 under certain circumstances. For example, as described above, certain threshold tests or checks may be performed by device 104 at first node 106-1 to determine whether a SON node may be of proper use to mobile station 120 as a transmitter of a positioning signal for use in signal-based position estimation.

Figure 2:
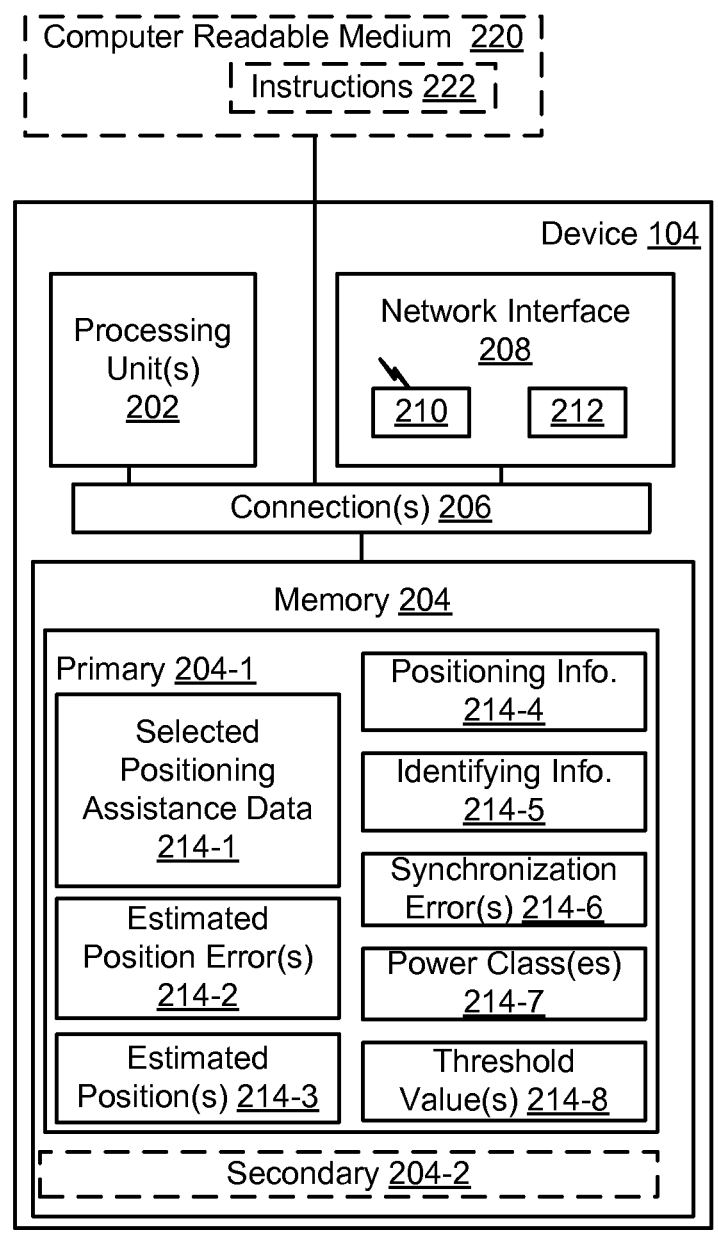
FIG. 2 is a schematic block diagram illustrating certain features of a device, for example as in FIG. 1, capable of providing selected positioning assistance data to a mobile station, in accordance with an implementation.

Reference is made next to FIG. 2, which is a schematic block diagram illustrating certain features of an example device 104 capable of providing selected positioning assistance data 214-1 to mobile station 120, in accordance with an implementation.

As illustrated, device 104 may take the form of a specific computing device comprising one or more processing units 202 to perform data processing (e.g., in accordance with all or part of the techniques provided herein) coupled to memory 204 via one or more connections 206. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within device 104. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220. As illustrated, memory 204 and/or computer readable medium 220 may comprise computer executable instructions 222 associated with data processing (e.g., in accordance with the techniques provided herein).

As further illustrated, at certain times, memory 204 may comprise data representing selected positioning assistance data 214-1, one or more estimated position errors 214-2, one or more estimated positions 214-3, positioning information 214-4, identifying information 214-5, one or more synchronization errors 214-6, one or more power classes 214-7, one or more threshold values 214-8, and/or the like or any combination thereof.

By way of non-limiting example, selected positioning assistance data 214-1 may comprise all or part of positioning information 214-4 which may be associated with one or more wireless transmitting devices 112 and/or one or more SON nodes 106 (see FIG. 1). For example, selected positioning assistance data 214-1 may comprise all or part of identifying 214-5 which may be identify specific wireless transmitting devices 112 and/or SON nodes 106 deemed operatively available to transmit positioning signals to mobile station 120. For example, selected positioning assistance data may uniquely identify a specific wireless transmitting device (e.g., by MAC address, etc.), identify an estimated and/or reported location of the specific wireless transmitting device (e.g., by coordinates, etc.), identify timing information associated with the specific wireless transmitting device (e.g., time reference, timing offset, errors, etc.), and/or identify other information associated with the specific wireless transmitting device (e.g., type, signals, network, affiliations, status, etc.) which may be of use to mobile station 120.

By way of non-limiting example, estimated positions 214-3 and/or estimated position errors 214-2 may be associated with one or more wireless transmitting devices 112 and/or one or more SON nodes 106. An estimated position may, for example, identify at least in part a relative position (e.g., distance away, etc.), and/or location (e.g., coordinates, etc.). An estimated position error may, for example, identify at least in part a potential error (e.g., distance, range, etc.) associated with an estimated and/or reported position and/or location of a wireless transmitting device or SON node.

By way of non-limiting example, synchronization errors 214-6 may be associated with the device/system time/timing as operatively applied one or more wireless transmitting devices 112 and/or one or more SON nodes 106, and/or differences in device/system time/timing there between.

By way of non-limiting example, power classes 214-7 may be associated with a type and/or other defining characteristic regarding the capability of one or more wireless transmitting devices 112 and/or one or more SON nodes 106 to transmit positioning and/or other like wireless signals, e.g., possibly with regard to some directional manner, etc.

By way of non-limiting example, one or more threshold values 214-8 may be considered in performing certain threshold tests or checks as previously described. In certain example implementations, one or more threshold values may be specified statically and/or dynamically. In certain example implementations, one or more threshold values may be associated with one or more mobile stations 120, one or more wireless transmitting devices 112 and/or one or more SON nodes 106, and/or one or more signal-based position estimation techniques.

Device 104 may, for example, comprise a network interface 208, which may be coupled to one or more of connections 206. Network interface 208 may be representative of one or more wireless interfaces 210 and/or non-wireless (e.g., wired network) interfaces 212.

Figure 3:
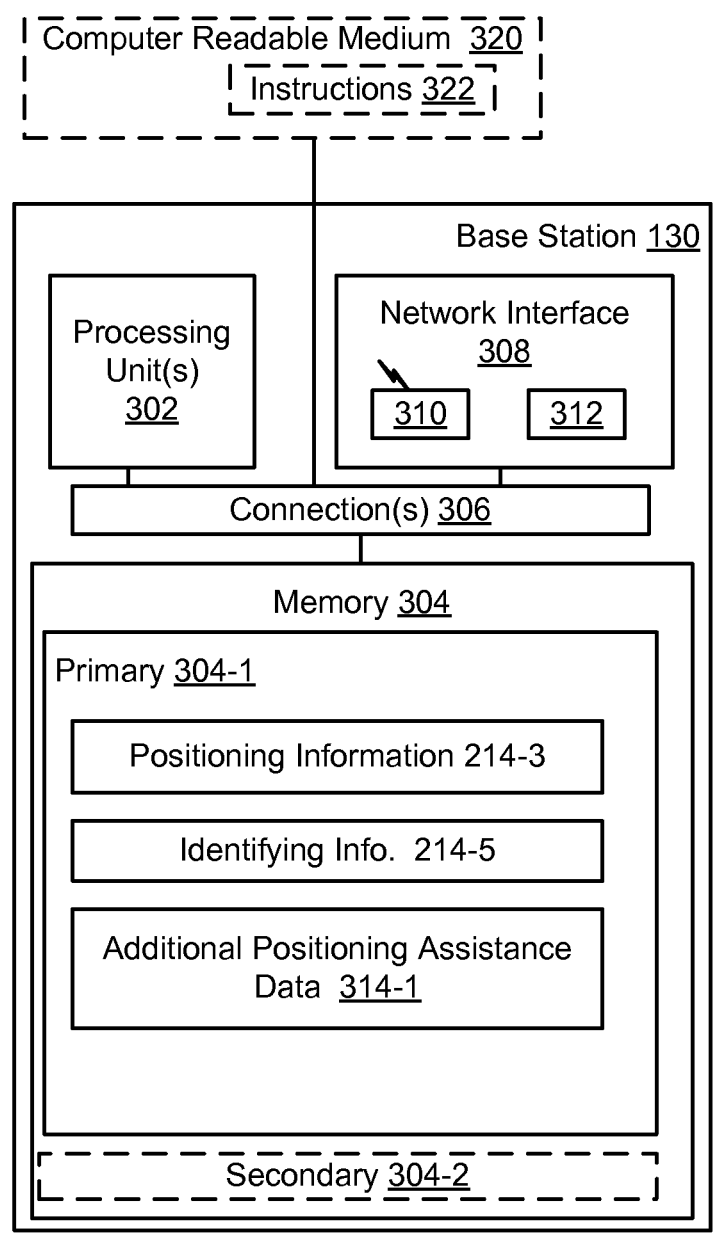
FIG. 3 is a schematic block diagram illustrating certain features of a base station, for example as in FIG. 1, for which selected positioning assistance data may be established and provided to a mobile station, in accordance with an implementation.
Figure 4:
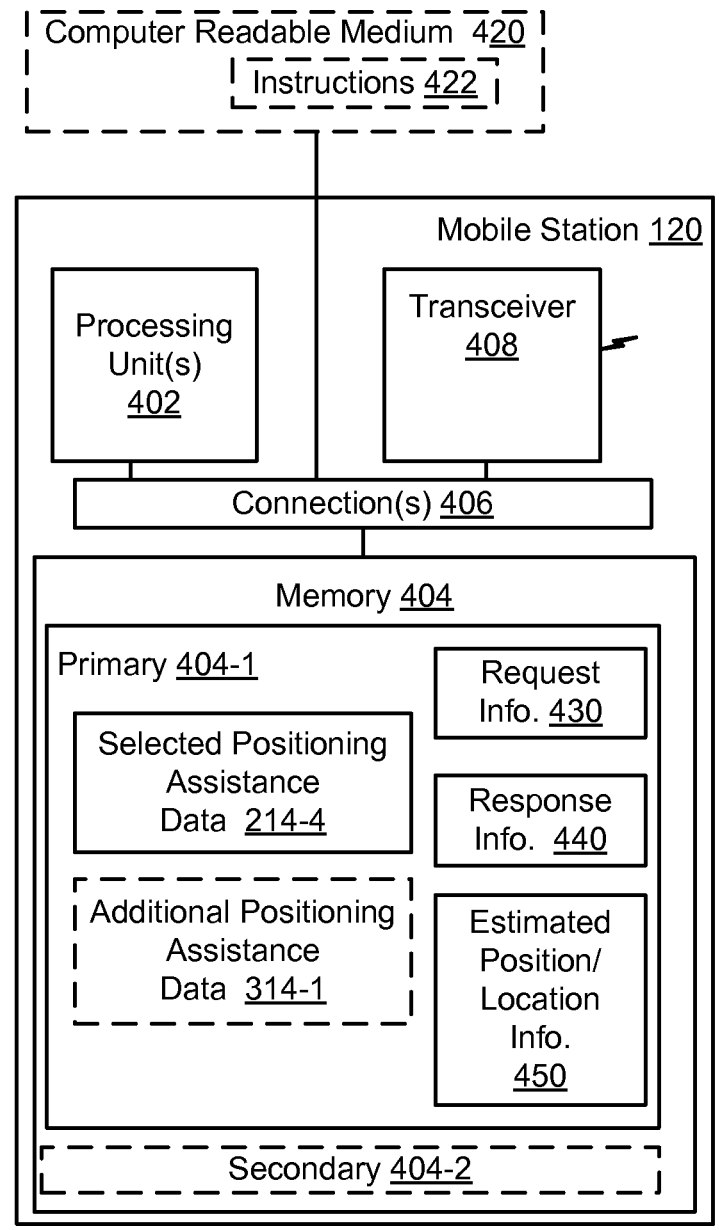
FIG. 4 is a schematic block diagram illustrating certain features of a mobile station, for example as in FIG. 1, capable of receiving selected positioning assistance data, in accordance with an implementation.

Reference is made next to FIG. 3 and FIG. 4, which are schematic block diagrams that are similar to that in shown in FIG. 2, but illustrating certain features of a base station 130 and a mobile station 120, respectively, in accordance with certain implementations.

For the sake of brevity, in certain example implementations: processing unit(s) 302 in FIG. 3 and 402 in FIG. 4 may take similar example forms as previously described regarding processing unit(s) 202; memory 304 in FIG. 3 and 404 in FIG. 4 may take similar example forms as previously described regarding memory 204; connections 306 in FIG. 3 and 406 in FIG. 4 may take similar example forms as previously described regarding memory 204; network interface 308 in FIG. 3 may take similar example forms as previously described regarding network interface 208; and computer readable medium 320 in FIG. 3 and 420 in FIG. 4 may take similar example forms as previously described regarding computer readable medium 220. Similarly, transmitter 408 (or transceiver, etc.) may take similar example forms as the wireless interface portion 210 of network interface 208. Hence, as previously described, applicable wireless communication capabilities may be provided between a wireless interface portion 210 and/or 310 and transmitter 408.

As shown in FIG. 3, memory 304 may comprise at times positioning information 214-3 (e.g., as may be provided to first node 106-1 and associated with at least base station 130), identifying information 214-5 (e.g., associated with base station 130), and possibly additional positioning assistance data 314-1 (e.g., as may be provided to mobile station 120 and associated with base station 130 and/or one or more other base stations and/or SON nodes). Here, instructions 322 may comprise specific instructions regarding all or part of the techniques provided herein which base station 130 may perform and/or otherwise support.

As shown in FIG. 4, memory 404 may store at times selected positioning assistance data 214-4 (e.g., as may be received from first node 106-1), additional positioning assistance data 314-1 (e.g., as may be received from base station 130 and associated with base station 130 and/or one or more other base stations and/or SON nodes), request information 430 (e.g., associated with one or more requests 150 and/or 160, see FIG. 1), response information 440 (e.g., associated with one or more responses 152 and/or 162, see FIG. 1), and estimated position and/or location information 450 associated with mobile station 120 (e.g., as a result of a signal-based position estimation process). Here, instructions 422 may comprise specific instructions regarding all or part of the techniques provided herein which mobile station 120 may perform and/or otherwise support.

Figure 5:
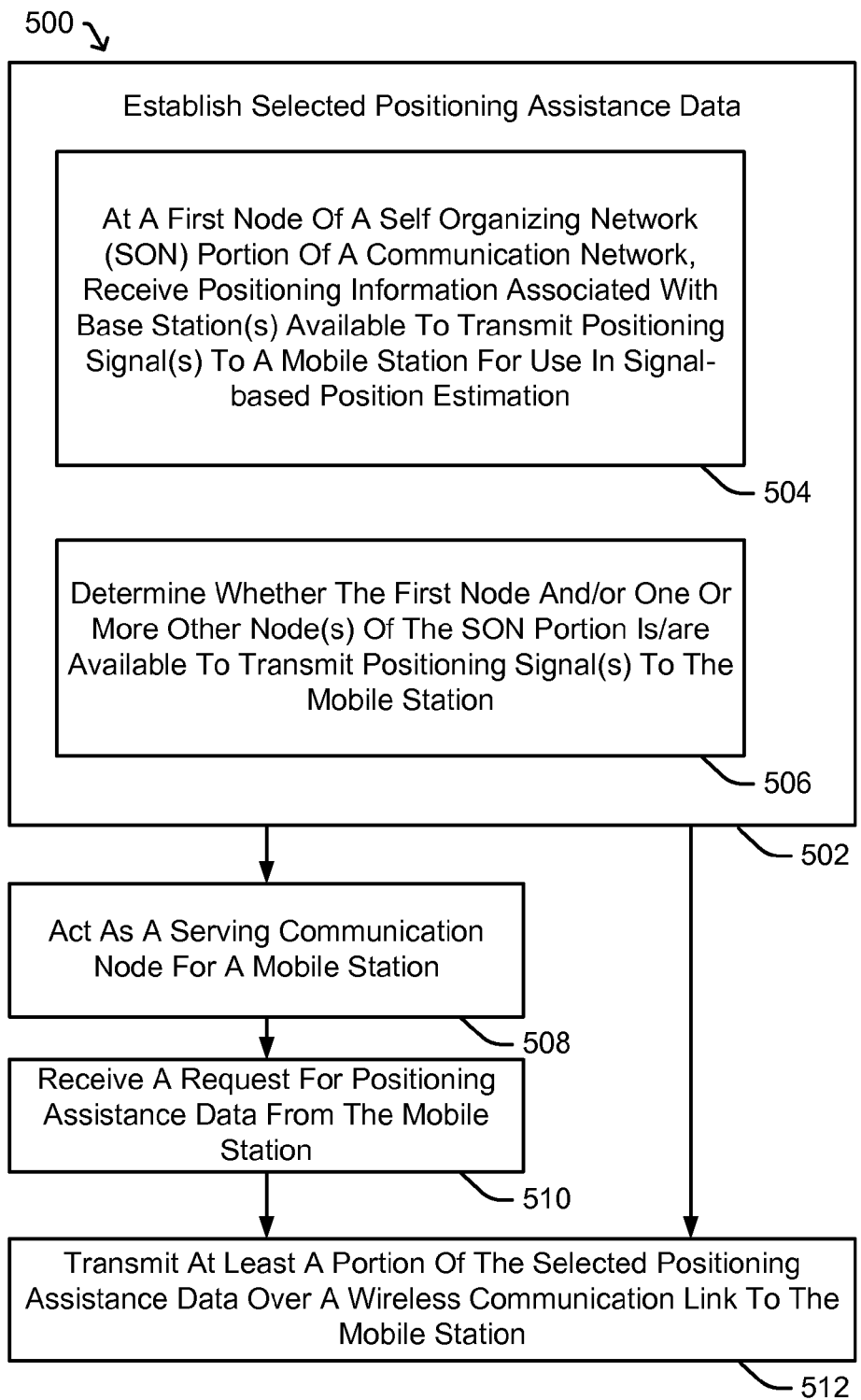
FIG. 5 is a flow diagram illustrating certain features of an exemplary process for use in a device, for example as in FIG.

Attention is drawn next to FIG. 5, which is a flow diagram illustrating certain features of an exemplary process 500 for use in a device 104 of first node 106-1 (see FIG. 1), capable of establishing and providing selected positioning assistance data 214-4 to a mobile station 120, in accordance with an implementation.

At block 502, selected positioning assistance data may be established. The selected positioning assistance data may, for example at block 504, be established based at least in part on received positioning information associated with one or more base stations of a communication network available to at least transmit one or more positioning signals to a mobile station for use in signal-based position estimation. The selected positioning assistance data may, for example at block 506, be established based at least in part on a determination as to whether the first node and/or at least one other node of a SON portion is available to transmit positioning signals to a mobile station.

At block 508, which may be optional in certain example implementations, the first node may act as a serving communication node for a mobile station. At block 510, which may also be optional in certain example implementations, the first node may receive a request for positioning assistance data from the mobile station.

At block 512, the first node may transmit at least a portion of the selected positioning assistance data to the mobile station over a communication link. For example, a first node may transmit at least a portion of the selected positioning assistance data to a mobile station in response to a request, e.g., as received at block 510. In certain example implementations, a first node may transmit at least a portion of the selected positioning assistance data to a mobile station for reasons independent of a request.

Attention is drawn next to FIG. 6, which is a flow diagram illustrating certain features of an exemplary process 600 for use in a mobile station 120 (see FIG. 1), which is capable of requesting and/or receiving selected positioning assistance data from a first node 106-1, and possibly additional positioning assistance data from a base station 130, in accordance with certain example implementations.

At block 602, a mobile station 120 may connect to a first node 106-1 of a SON portion of communication network as a serving communication node. At block 604, a mobile station 120 may (optionally) transmit a request for positioning assistance data from a first node 106-1. At block 606, a mobile station 120 may receive, from a first node 106-1, a response (e.g., to a request at block 604, and/or as transmitted for other reasons) comprising selected positioning assistance data.

At block 608, which may be optional in certain example implementations, a mobile station 120 may transmit a request for additional positioning assistance data from a base station 130. At block 610, which may be optional in certain example implementations, a mobile station 120 may receive, from a base station 130, a response comprising additional positioning assistance data.

At block 612, a mobile station 120 may perform signal-based position estimation to estimate its own position/location. The signal-based position estimation may be based, at least in part, on selected positioning assistance data (e.g., as received at block 606). The signal-based position estimation may (optionally) be based, at least in part, on additional positioning assistance data (e.g., as received at block 610).

The signal-based position estimation may be based, at least in part, on one or more transmitted positioning signals received from one or more base stations and (optionally) from one or more SON nodes.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. It should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing is intended for illustrative purposes.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for establishing selected positioning information, the method comprising:
   receiving, at a first self-provisioned access point, positioning information from at least one base station of a communication network, each base station being available to transmit said positioning information to a mobile station for use in signal-based position estimation;
   determining, at said first self-provisioned access point, whether said first self-provisioned access point is available to transmit said positioning information, to said mobile station for signal-based position estimation, based on at least a position error of said self-provisioned access point, a synchronization error of said self-provisioned access point, a transmit power of said self-provisioned access point, or a combination thereof;
   selecting, at said first self-provisioned access point, positioning information received from said at least one base station when said first self-provisioned access point is available to transmit said positioning information; and
   transmitting, by said first self-provisioned access point, said selected positioning information to said mobile station, said selected positioning information being used for signal-based position estimation by said mobile station or for determining whether to request additional positioning information from said at least one base station.

2. The method as recited in claim 1, wherein said synchronization error is an estimated synchronization error between said first self-provisioned access point and said at least one base station, said position error is an estimated position error associated with an estimated position of said first self-provisioned access point, and said transmit power is a power class associated with said first self-provisioned access point.

3. The method as recited in claim 1, further comprising determining whether a second self-provisioned access point is available to transmit said positioning information based, at least in part, on at least an estimated synchronization error between said second self-provisioned access point and said at least one base station, an estimated position error associated with an estimated position of said second self-provisioned access point, a power class associated with said second self-provisioned access point, or a combination thereof.

4. The method as recited in claim 1, wherein said transmitting is performed in response to a request for positioning information received from said mobile station while said first self-provisioned access point is acting as a serving communication node to said mobile station.

5. The method as recited in claim 1, wherein at least a portion of said received positioning information is received over a non-wireless communication link.

6. The method as recited in claim 1, wherein said transmitted selected positioning information comprises information identifying a plurality of base stations.

7. The method as recited in claim 1, wherein said transmitted selected positioning information comprises information identifying a particular base station from which additional positioning information is available to said mobile station.

8. The method as recited in claim 1, wherein said received positioning information comprises at least identity data for each base station, an estimated location for each base station, timing information for each base station, other information associated with each base station, an estimated position error, a power class, or a combination thereof.

9. A first self-provisioned access point in a self organizing network portion of a communication network, said first self-provisioned access point comprising:
   a memory unit; and
   at least one processor coupled to said memory unit, the at least one processor being configured:
      to receive positioning information received from at least one base station of said communication network, each base station being available to transmit said positioning information to a mobile station for use in signal-based position estimation;
      to determine whether said first self-provisioned access point is available to transmit said positioning information, to said mobile station for signal-based position estimation, based on at least a position error of said self-provisioned access point, a synchronization error of said self-provisioned access point, transmit power of said self-provisioned access point, or a combination thereof;
      to select, at said first self-provisioned access point, positioning information received from said at least one base station when said first self-provisioned access point is available to transmit said positioning information; and
      to transmit said selected positioning information to said mobile station, said selected positioning information being used for signal-based position estimation by said mobile station or for determining whether to request additional positioning information from said at least one base station.

10. The apparatus as recited in claim 9, wherein said synchronization error is an estimated synchronization error between said first self-provisioned access point and said at least one base station, said position error is an estimated position error associated with an estimated position of said first self-provisioned access point, and said transmit power is a power class associated with said first self-provisioned access point.

11. The apparatus as recited in claim 9, wherein said at least one processor is further configured to determine whether a second self-provisioned access point is available to transmit said positioning information based, at least in part, on at least an estimated synchronization error between said second self-provisioned access point and said at least one base station, an estimated position error associated with an estimated position of said second self-provisioned access point, a power class associated with said second self-provisioned access point, or a combination thereof.

12. The apparatus as recited in claim 9, wherein said at least one processor is further configured to transmit at least a portion of said selected positioning information in response to a request for positioning information received from said mobile station while said first self-provisioned access point is acting as a serving communication node to said mobile station.

13. The apparatus as recited in claim 9, wherein at least a portion of said received positioning information is received over a non-wireless communication link.

14. The apparatus as recited in claim 9, wherein said transmitted selected positioning information comprises information identifying a plurality of base stations.

15. The apparatus as recited in claim 9, wherein said transmitted selected positioning information comprises information identifying a particular base station from which additional positioning information is available to said mobile station.

16. The apparatus as recited in claim 9, wherein said received positioning information comprises at least identity data for each base station, an estimated location for each base station, timing information for each base station, other information associated with each base station, an estimated position error, a power class, or a combination thereof.

17. An apparatus for use in a first self-provisioned access point of a self organizing network portion of a communication network, said apparatus comprising:
- means for receiving, at said first self-provisioned access point, positioning information from at least one base station of said communication network, each base station being available to transmit said positioning information to a mobile station for use in signal-based position estimation;
- means for determining, at said first self-provisioned access point, whether said first self-provisioned access point is available to transmit said positioning information, to said mobile station for signal-based position estimation, based on at least a position error, a synchronization error, a transmit power, or a combination thereof; and
- means for selecting, at said first self-provisioned access point, positioning information received from said at least one base station when said first self-provisioned access point is available to transmit said positioning information; and
- means for transmitting, by said first self-provisioned access point, said selected positioning information to said mobile station, said selected positioning information being used for signal-based position estimation by said mobile station or for determining whether to request additional positioning information from said at least one base station.

18. The apparatus as recited in claim 17,
wherein said synchronization error is an estimated synchronization error between said first self-provisioned access point and said at least one base station, said position error is an estimated position error associated with an estimated position of said first self-provisioned access point, and said transmit power is a power class associated with said first self-provisioned access point.

19. The apparatus as recited in claim 17, further comprising:
- means for determining whether a second self-provisioned access point of said self organizing network portion is available to transmit said positioning information based, at least in part, on at least an estimated synchronization error between said second self-provisioned access point and said at least one base station, an estimated position error associated with an estimated position of said second self-provisioned access point, a power class associated with said second self-provisioned access point, or a combination thereof.

20. The apparatus as recited in claim 17, further comprising:
- means for operating said first self-provisioned access point as a serving communication access point to said mobile station; and
- means for receiving a request for positioning information data from said mobile station.

21. The apparatus as recited in claim 17, further comprising:
- means for receiving at least a portion of said received positioning information over a non-wireless communication link.

22. A computer program product for wireless communications in a self organizing network portion of a communication network, the computer program product comprising:
- a non-transitory computer-readable medium having program code recorded thereon, the program code being executable by a processor and comprising:
  - program code to receive, at a first self-provisioned access point, positioning information from at least one base station of said communication network, each base station being available to transmit said positionings information to a mobile station for use in signal-based position estimation;
  - program code to determine, at said first self-provisioned access point, whether said first self-provisioned access point is available to transmit said positioning information, to said mobile station for signal-based position estimation, based on at least a position error of said self-provisioned access point, a synchronization error of said self-provisioned access point, a transmit power of said self-provisioned access point, or a combination thereof;
  - program code to select, at said first self-provisioned access point, positioning information received from said at least one base station when said first self-provisioned access point is available to transmit said positioning information; and
  - program code to transmit, said selected positioning information to said mobile station, said selected positioning information being used for signal-based position estimation by said mobile station or for determining whether to request additional positioning information from said at least one base station.

23. The computer program product as recited in claim 22, wherein said synchronization error is an estimated synchronization error between said first self-provisioned access point and said at least one base station, said position error is an estimated position error associated with an estimated position of said first self-provisioned access point, and said transmit power is a power class associated with said first self-provisioned access point.

24. The computer program product as recited in claim 22, wherein said program code further comprises:
- program code to determine whether a second self-provisioned access point of said self organizing network portion is available to transmit said positioning information based, at least in part, on at least an estimated synchronization error between said second self-provisioned access point and said at least one base station, an estimated position error associated with an estimated position of said second self-provisioned access point, a power class associated with said second self-provisioned access point, or a combination thereof.

25. The computer program product as recited in claim 22, wherein said program code further comprises:
- program code to initiate transmission of at least a portion of said selected positioning information in response to a request for positioning information received from said mobile station while said first self-provisioned access point acts as a serving communication node to said mobile station.

26. The computer program product as recited in claim 22, wherein at least a portion of said received positioning information is received over a non-wireless communication link.

27. The computer program product as recited in claim 22, wherein said transmitted selected positioning information comprises information identifying a plurality of base stations.

28. The computer program product as recited in claim 22, wherein said transmitted selected positioning information comprises information identifying a particular base station from which additional positioning information is available to said mobile station.

29. The computer program product as recited in claim 22, wherein said received positioning information comprises at least identity data for each base station, an estimated location for each base station, timing information for each base station, other information associated with each base station, or a combination thereof and at least an estimated position, an estimated position error, a power class, or a combination thereof.

* * * * *